United States Patent
Guo et al.

(10) Patent No.: US 11,294,963 B2
(45) Date of Patent: Apr. 5, 2022

(54) STRING MATCHING METHOD, STRING MATCHING APPARATUS, STORAGE MEDIUM, AND ELECTRONIC DEVICE

(71) Applicant: BEIJING XIAOMI MOBILE SOFTWARE CO., LTD., Beijing (CN)

(72) Inventors: Zhiliang Guo, Beijing (CN); Jiajia Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 185 days.

(21) Appl. No.: 16/699,456

(22) Filed: Nov. 29, 2019

(65) Prior Publication Data
US 2020/0380046 A1    Dec. 3, 2020

(30) Foreign Application Priority Data

May 31, 2019  (CN) .......................... 201910471598.5

(51) Int. Cl.
G06F 16/903    (2019.01)
G06K 9/72      (2006.01)
(Continued)

(52) U.S. Cl.
CPC ...... *G06F 16/90344* (2019.01); *G06V 10/768* (2022.01); *G06V 30/10* (2022.01)

(58) Field of Classification Search
CPC .. G06F 16/33; G06F 16/316; G06F 16/90344; G06K 9/72; G06K 2209/01
See application file for complete search history.

(56) References Cited

U.S. PATENT DOCUMENTS 6,889,218 B1 * 5/2005 Nassehi ................. G06F 21/55
                                                        706/45
2006/0047611 A1 * 3/2006 Selifonov .............. G06N 3/126
                                                        706/13
(Continued)

FOREIGN PATENT DOCUMENTS

CN    101158980 A       4/2008
CN    101388044 A  *    3/2009
CN    101556619 A      10/2009

OTHER PUBLICATIONS

Barr ("Decompression-free inspection: DPI for shared dictionary compression over HTTP"; Publication data: INFOCOM, 2012 Proceedings IEEE, Mar. 25, 2012 IEEE; Source info: Pertinent pp. 1-5; URL: https://www.cs.huji.ac.il/~dhay/publications/SDCH.pdf.) (Year: 2012).*
Extended European Search Report dated Apr. 24, 2020 in Patent Application No. 19214934.2, citing documents AX and AY therein, 8 pages.

(Continued)

*Primary Examiner* — Peet Dhillon
(74) *Attorney, Agent, or Firm* — Oblon, McClelland, Maier & Neustadt, L.L.P.

(57) ABSTRACT

The present disclosure relates to a string matching method, a string matching apparatus, a storage medium, and an electronic device. The method can include loading a first string and obtaining position information of a node element of an AC automaton in the first string and a node position relation of the node element on the AC automaton. The method can further include creating a skip list based on the position information and the node position relation, performing a depth-first traversal on the AC automaton, and obtaining a first matching result of a path between each target node and a parent node of the target node and the first string based on the skip list. Further, the method can include outputting a matching result of the first string and the preset matching rule based on the first matching result of each path included in the AC automaton and the first string.

14 Claims, 11 Drawing Sheets

(51) Int. Cl.
*G06V 10/70* (2022.01)
*G06V 30/10* (2022.01)

(56) References Cited

U.S. PATENT DOCUMENTS

| | | | | |
|---|---|---|---|---|
| 2007/0112714 | A1* | 5/2007 | Fairweather | G06K 13/0825 |
| | | | | 706/46 |
| 2007/0282835 | A1* | 12/2007 | Duxbury | G06F 16/9024 |
| 2010/0049712 | A1* | 2/2010 | Tago | G06F 16/00 |
| | | | | 707/758 |
| 2011/0225429 | A1* | 9/2011 | Papamanthou | G06F 21/64 |
| | | | | 713/189 |
| 2012/0158780 | A1* | 6/2012 | Koyanagi | G06F 16/00 |
| | | | | 707/769 |
| 2013/0297641 | A1* | 11/2013 | Shinjo | G06F 16/24 |
| | | | | 707/758 |
| 2015/0161266 | A1* | 6/2015 | Conradt | G06F 16/9535 |
| | | | | 707/706 |

OTHER PUBLICATIONS

Anat Bremler-Barr, et al., "Decompression-Free Inspection: DPI for Shared Dictionary Compression Over HTTP", INFOCOM, 2012 Proceedings IEEE, XP032178937, Mar. 25, 2012, pp. 1987-1995.
William Pugh, "Skip Lists: A Probabilistic Alternative to Balanced Trees", Algorithms and Data Structures. International Workshop, XX, XX, XP001152233, Jan. 1, 1989, pp. 437-449.
Office Action dated Dec. 1, 2020 in corresponding Chinese Patent Application No. 201910471598.5 (with English Translation), citing documents AO and AP therein, 34 pages.

* cited by examiner

STRING MATCHING METHOD, STRING MATCHING APPARATUS, STORAGE MEDIUM, AND ELECTRONIC DEVICE

CROSS-REFERENCE TO RELATED APPLICATIONS

This application is based upon and claims priority to Chinese Patent Application No. 201910471598.5, filed May 31, 2019, the entire contents of which are incorporated herein by reference.

TECHNICAL FIELD

The present disclosure relates to the field of text or network content processing, and more particularly, to a string matching method, a string matching apparatus, a storage medium, and an electronic device.

BACKGROUND

Information is a form of universal connection. Reasonable information matching and screening greatly benefits the work and life of people. For example, in the field of service, a service quality may be simply and conveniently monitored by matching keywords with content of a customer service. Further, in the field of network security, a user behavior sequence may be matched with an abnormal behavior sequence, so that detection and interception of abnormal users can be realized.

Aho-Corasick (AC) automaton, a common multi-pattern matching method, may perform parallel matching on target strings in a string to be matched, and is widely applied to fields such as search engines and word frequency statistics.

SUMMARY

The present disclosure provides a string matching method, a string matching apparatus, a storage medium, and an electronic device. Embodiments of a first aspect of the present disclosure provide a string matching method that can include loading a first string to be matched, obtaining position information of a node element of a multi-pattern-matching Aho-Corasick (AC) automaton in the first string to be matched, and a node position relation of the node element on the AC automaton, the AC automaton being generated based on a preset string matching rule. The method can further include creating a skip list based on the position information and the node position relation, performing a depth-first traversal on the AC automaton, and obtaining a first matching result of a path between each target node and a parent node of the target node and the first string to be matched based on the skip list, the target node being a node traversed each time. A matching result can be outputted of the first string to be matched and the preset matching rule based on the first matching result of each path included in the AC automaton and the first string to be matched.

Alternatively, obtaining the position information of the node element of the AC automaton in the first string to be matched can include obtaining position information of each node element in the first string to be matched, and generating a set of position information corresponding to each node element based on the position information, the position information for indicating a sequencing of each node element in the AC automaton appearing in the first string to be matched. Creating the skip list based on the position information and the node position relation can include creating a linked list index corresponding to each node element based on the set of position information, and creating the skip list based on a hierarchical relationship among node elements in a set of node elements for representing the same matching rule in the AC automaton, and the linked list index, in which in the skip list, a linked list index of a child node is a lower layer of a linked list index of the parent node.

Alternatively, performing the depth-first traversal on the AC automaton, and obtaining the first matching result of the path between each target node and the parent node of the target node and the first string to be matched based on the skip list includes: when nodes of a first layer in the AC automaton are traversed, sequentially adding marks to the position information in the linked list indexes corresponding to node elements in the nodes of the first layer, in which the marked position information in the linked list indexes corresponding to the node elements in the nodes of the first layer is used as initial position information for searching the skip list; when nodes below the first layer in the AC automaton are traversed, taking the nodes below the first layer as target nodes; when it is determined that target position information exists in a way of searching the skip list, determining that the path between the parent node of the target node and the target node is matched with the first string to be matched, the target position information being, position information, in the linked list index corresponding to the node element of the target node, posterior to the latest marked position information in the linked list index corresponding to the node element of the parent node of the parent node; and adding a mark to the target position information, the marked target position information being initial position information for starting to search the skip list when the child node of the target node is traversed.

Alternatively, loading the first string to be matched can include loading a second string to be matched, and obtaining the first string to be matched by filtering out a part, which is not node elements in the AC automaton, in the second string to be matched.

In an exemplary embodiment, the first string to be matched is for representing a user behavior, and the matching rule is for representing a user-abnormal-behavior matching rule. Outputting the matching result of the first string to be matched and the preset matching rule based on the first matching result of each path included in the AC automaton and the first string to be matched can include outputting a matching result representing an abnormal behavior of a user after all paths included in the AC automaton are matched.

Embodiments of a second aspect of the present disclosure provide a computer readable storage medium having a computer program instruction stored thereon, in which when the program instruction is executed by a processor, the program causes the processor to implement the string matching method provided in the first aspect of the present disclosure.

Embodiments of a third aspect of the present disclosure provide an electronic device, that can include a memory having a computer program stored thereon, and processor, configured to execute the computer program in the memory for implementing the string matching method provided in the first aspect of the present disclosure.

It should be understood that the above general description and the following detailed description are merely illustrative and explanatory, and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Before introducing the string matching method, the string matching apparatus, the storage medium, and the electronic device, provided by the present disclosure, the scenario of the present disclosure is introduced. Embodiments according to the present disclosure may be applied to various string matching occasions, such as matching keywords from chat records of customer service and matching a behavior sequence of a user with an abnormal behavior sequence. The AC automaton is a parallel multi-pattern matching method and is applied to fields of word frequency statistics and search engines. However, the AC automaton may only perform accurate matching, namely, the matching rule is required to be determined.

If the fuzzy field matching is realized through the AC automaton, the fuzzy field matching may be realized by a method of compiling a large number of regular expressions or disassembling matching rules. However, the former method cannot be operated in parallel and the latter has complex flow and a high time complexity of the system. As a whole, the efficiency is low, so that it is difficult to apply the two methods to an actual fuzzy matching occasion. The skip list is a randomized data structure, which is an ordered linked list capable of performing binary search in essence, and the skip list may realize fast search by adding a multi-level index on an original ordered linked list, thereby improving search performance.

Figure 1:
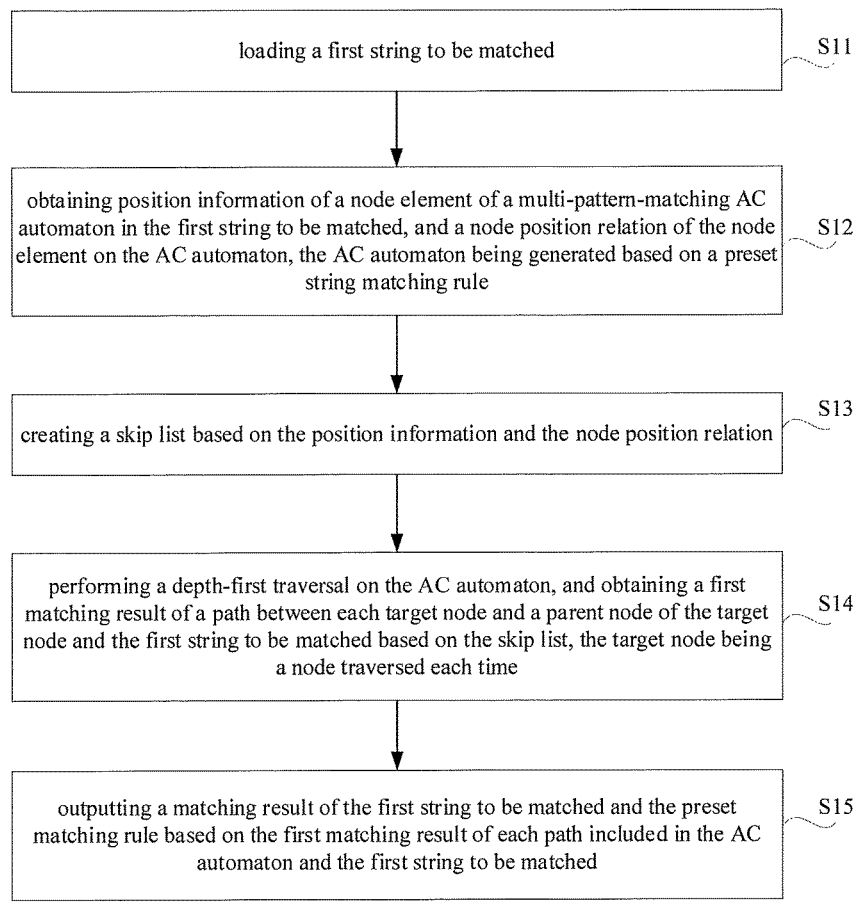
FIG. 1 is a flowchart of a string matching method according to an exemplary embodiment.

FIG. 1 is a flowchart of a string matching method according to an exemplary embodiment. As illustrated in FIG. 1, the string matching method can include the following.

At block S11, a first string to be matched is loaded.

At block S12, position information of a node element of an AC automaton in the first string to be matched, and a node position relation of the node element on the AC automaton, can be obtained. The AC automaton is generated based on a preset string matching rule.

The preset matching rule may be a determined matching rule or a fuzzy matching rule containing wildcard(s). The number of the matching rules may be one or more. In the implementation process, when the matching rule contains the wildcard(s), the wildcard(s) may be neglected and filtered out to obtain the determined matching rule, and the AC automaton may be generated based on the determined matching rule.

For example, the string matching method may be applied to the field of network security, and the matching rule may be abnormal behavior sequences 3*6*7*8, and 2*5*6 which are known by a system and represent an abnormal state of a user. When the AC automaton is created for the abnormal behavior sequence, the system may filter wildcards from the abnormal behavior sequences to obtain the determined matching rules 3678 and 256, and the AC automaton is created based on the new matching rules 3678, 256.

It should be noted that the node element may be a single character or a string of characters, and the disclosure is not limited thereto. Furthermore, a specific matching rule may be embodied on the AC automaton as a continuous path from a root node to a final node. The path connects all node elements constituting the matching rule, and may include one or more sub-paths. In an implementation, a skip list index corresponding to the matching rule may be created based on a position relationship of a corresponding node element on the AC automaton.

At block S13, a skip list is created based on the position information and the node position relation.

At block S14, a depth-first traversal is performed on the AC automaton, and a first matching result of a path between each target node and a parent node of the target node, and the first string to be matched is obtained based on the skip list. The target node is a node traversed each time.

That is, in the matching process, the path matching order may be determined by performing the depth-first traversal on the AC automaton and the matching result of the path may be obtained through the skip list.

At block S15, a matching result of the first string to be matched and the preset matching rule is output based on the first matching result of each path included in the AC automaton and the first string to be matched.

It should be understood that the matching result of the first string to be matched and the matching rule may be set based on actual conditions. The matching result may be determined based on the first matching result of each path included in the AC automaton and the first string to be matched. That is, when determining whether the first string to be matched and the matching rule are successfully matched, all paths included in the AC automaton may not be required to be successfully matched with the first string to be matched. For example, when the service content of the customer service is subjected to a prohibited character matching, an occurrence of a prohibited behavior may be determined as long as one prohibited character is successfully matched.

By adopting the above method, the following technical effects may be achieved. For example, by generating the AC automaton based on the preset matching rule, a characteristic that the AC automaton may reduce the query time with a public prefix of the matching rule is used, thereby greatly reducing repeated comparison process. Meanwhile, the skip list is created based on the node position relation of the node element of the AC automaton on the AC automaton and the position information of the corresponding node element in the string to be matched. By utilizing a characteristic that the skip list index may realize quick search, the skip list index is applied to each path in the AC automaton to quickly obtain the matching result of the path. Finally, the AC automaton is traversed preferentially to complete selection of a sequencing of the matching path, the first matching result of the corresponding path is obtained through the skip list, and the matching result of the first string to be matched and the preset matching rule is determined based on the first matching result of each path in the AC automaton and the first string to be matched, so that advantages of the AC automaton and the skip list index are combined, efficient parallel fuzzy matching is realized, and string matching efficiency is improved.

Figure 2:
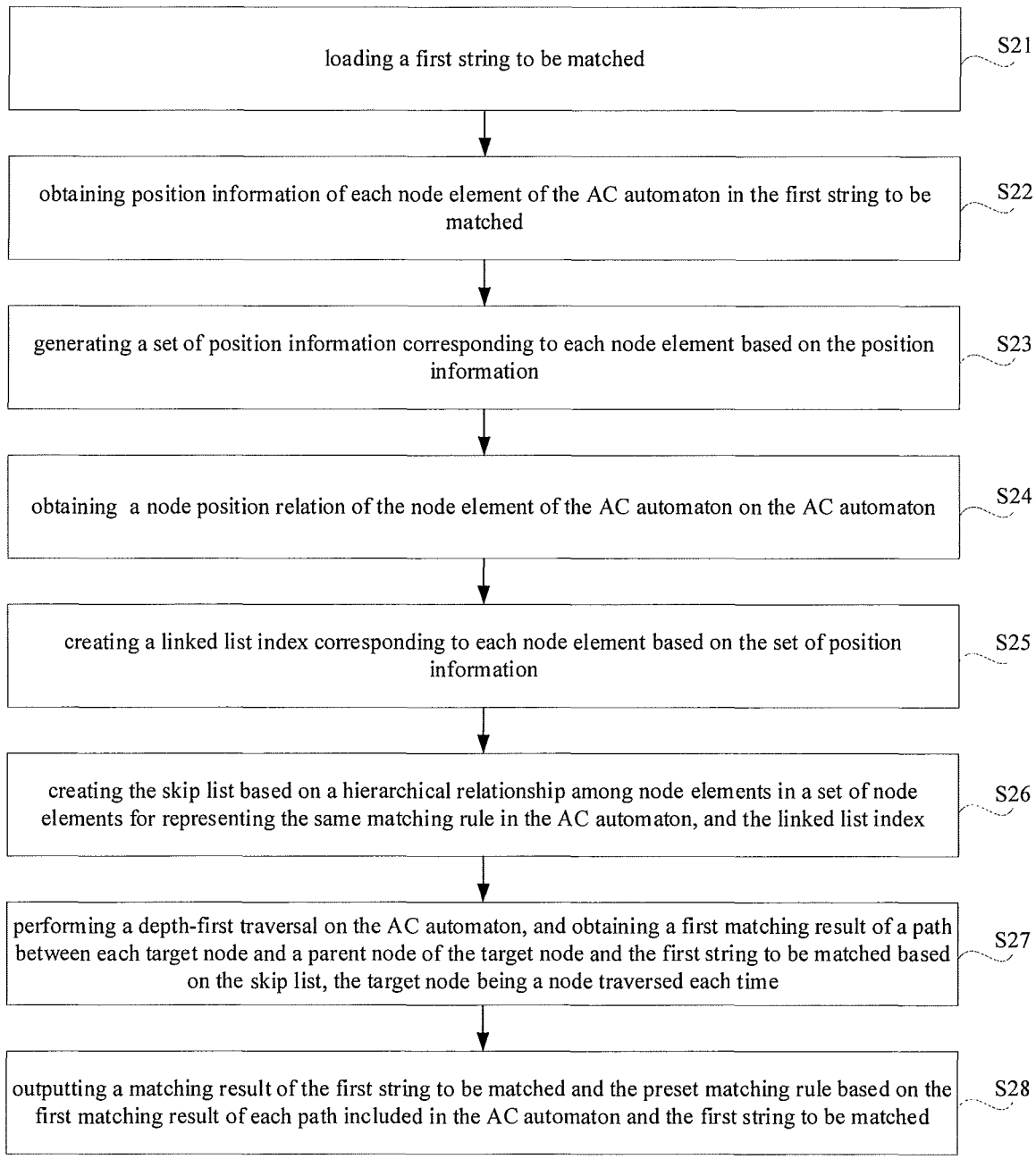
FIG. 2 is a flowchart of a string matching method according to an exemplary embodiment.

FIG. 2 is a flowchart of a string matching method according to an exemplary embodiment. Referring to FIG. 2, the method can include the following.

At block S21, a first string to be matched is loaded.

At block S22, position information of each node element of the AC automaton in the first string to be matched is obtained.

At block S23, a set of position information corresponding to each node element is generated based on the position information.

The position information is configured to indicate a sequencing of each node element in the AC automaton appearing in the first string to be matched. In an implementation, the position information may be a subscript of a position where the node element appears in the first string to be matched. Illustratively, when the node element appears at the first bit, the third bit and the fifth bit of the first string to be matched, the set of position information of the node element is {1, 3, 5}.

At block S24, a node position relation of the node element of the AC automaton on the AC automaton is obtained.

At block S25, a linked list index corresponding to each node element is created based on the set of position information.

At block S26, the skip list is created based on a hierarchical relationship among node elements in a set of node elements for representing the same matching rule in the AC automaton, and the linked list index.

In the skip list, a linked list index of a child node is a lower layer of a linked list index of the parent node. It should be understood that a specific matching rule may be embodied on the AC automaton as a continuous path from a root node to a final node, the path connecting all node elements constituting the matching rule. When the skip list is created, the linked list index of the child node may be set as the lower layer of the linked list index of the parent node based on the position relation of the parent node and the child node existing between adjacent nodes of the AC automaton.

At block S27, a depth-first traversal is performed on the AC automaton, and a first matching result of a path between each target node and a parent node of the target node and the first string to be matched is obtained based on the skip list. The target node is a node traversed each time.

At block S28, a matching result of the first string to be matched and the preset matching rule is output based on the first matching result of each path included in the AC automaton and the first string to be matched.

That is to say, by creating the skip list index for the matching rule, in the actual matching process, the matching sequence of the paths may be determined by performing the depth-first traversal on the AC automaton, thereby achieving the effect of performing parallel matching on all the matching rules simultaneously. Meanwhile, matching results of relevant paths may be determined based on the created skip list indexes, so that the time complexity of the method is reduced by using the skip list index and the matching rule is expanded to fuzzy fields. Consequently, the problem that a conventional AC automaton cannot efficiently perform the parallel fuzzy matching is solved.

Figure 3:
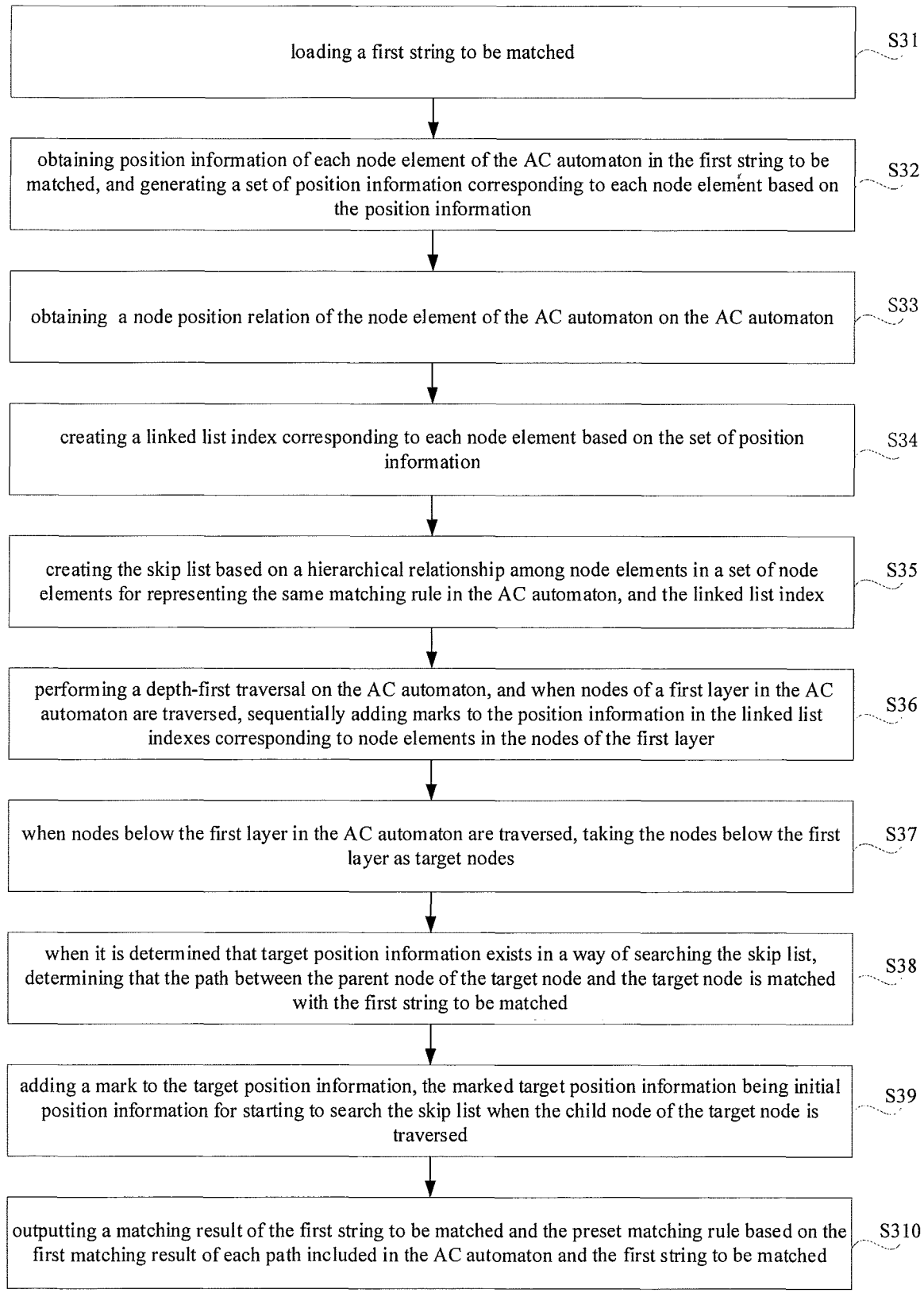
FIG. 3 is a flowchart of a string matching method according to an exemplary embodiment.

FIG. 3 is a flowchart of a string matching method according to an exemplary embodiment. As illustrated in FIG. 3, the string matching method includes the following.

At block S31, a first string to be matched is loaded.

At block S32, position information of each node element of the AC automaton in the first string to be matched is obtained. A set of position information corresponding to each node element is generated based on the position information. The position information is configured to indicate a sequencing of each node element in the AC automaton in the string to be matched.

At block S33, a node position relation of the node element of the AC automaton on the AC automaton is obtained.

At block S34, a linked list index corresponding to each node element is created based on the set of position information.

At block S35, the skip list is created based on a hierarchical relationship among node elements in a set of node elements for representing the same matching rule in the AC automaton, and the linked list index. In the skip list, a linked list index of a child node is a lower layer of a linked list index of a parent node. At block S36, a depth-first traversal is performed on the AC automaton. When nodes of a first layer in the AC automaton are traversed, marks are sequentially added to the position information in the linked list indexes corresponding to node elements in the nodes of the first layer.

The marked position information in the linked list indexes corresponding to the node elements in the nodes of the first layer is used as initial position information for searching the skip list.

At block S37, when nodes below the first layer in the AC automaton are traversed, the nodes below the first layer are taken as target nodes. At block S38, when it is determined that target position information exists in a way of searching the skip list, it is determined that the path between the parent node of the target node and the target node is successfully matched with the first string to be matched.

The target position information is position information, in the linked list index corresponding to the node element of the target node, posterior to the latest marked position information in the linked list index corresponding to the node element of the parent node of the parent node.

At block S39, a mark is added to the target position information, in which the marked target position information is initial position information for starting to search the skip list when the child node of the target node is traversed.

At block S310, a matching result of the first string to be matched and the preset matching rule is output based on the first matching result of each path included in the AC automaton and the first string to be matched.

Therefore, in the matching process, the string matching method may not only expand the matching rule to the fuzzy fields, but also mark all matched results, namely, all targets which accord with the matching rule may be found in the string to be matched. Therefore, efficient parallel fuzzy matching is achieved and targets conforming to the fuzzy matching rule may be marked, such that subsequent statistics and analysis are facilitated, and the practicability of the method is improved.

It should be noted that, in the actual matching process, based on the actual requirement, it may be determined whether there is a target (as only as one target that meets the matching rule exists) that meets the matching rule in the string to be matched, or all targets that meet the matching rule may be found out, which is not limited in the present disclosure.

It should also be noted that, for simplicity of description, the above-mentioned method embodiments are all described as a series of combinations of actions. However, those skilled in the art should understand that the present disclosure is not limited by the described sequence of actions. For example, referring to FIGS. 3 and 4, the position information of the node element of the AC automaton in the first string to be matched and the node position relation of the node element on the AC automaton may also be obtained simultaneously in no particular order. Furthermore, those skilled in the art will also appreciate that the embodiments described in the specification are examples and that no actions related are necessarily required by the present disclosure.

Figure 4:
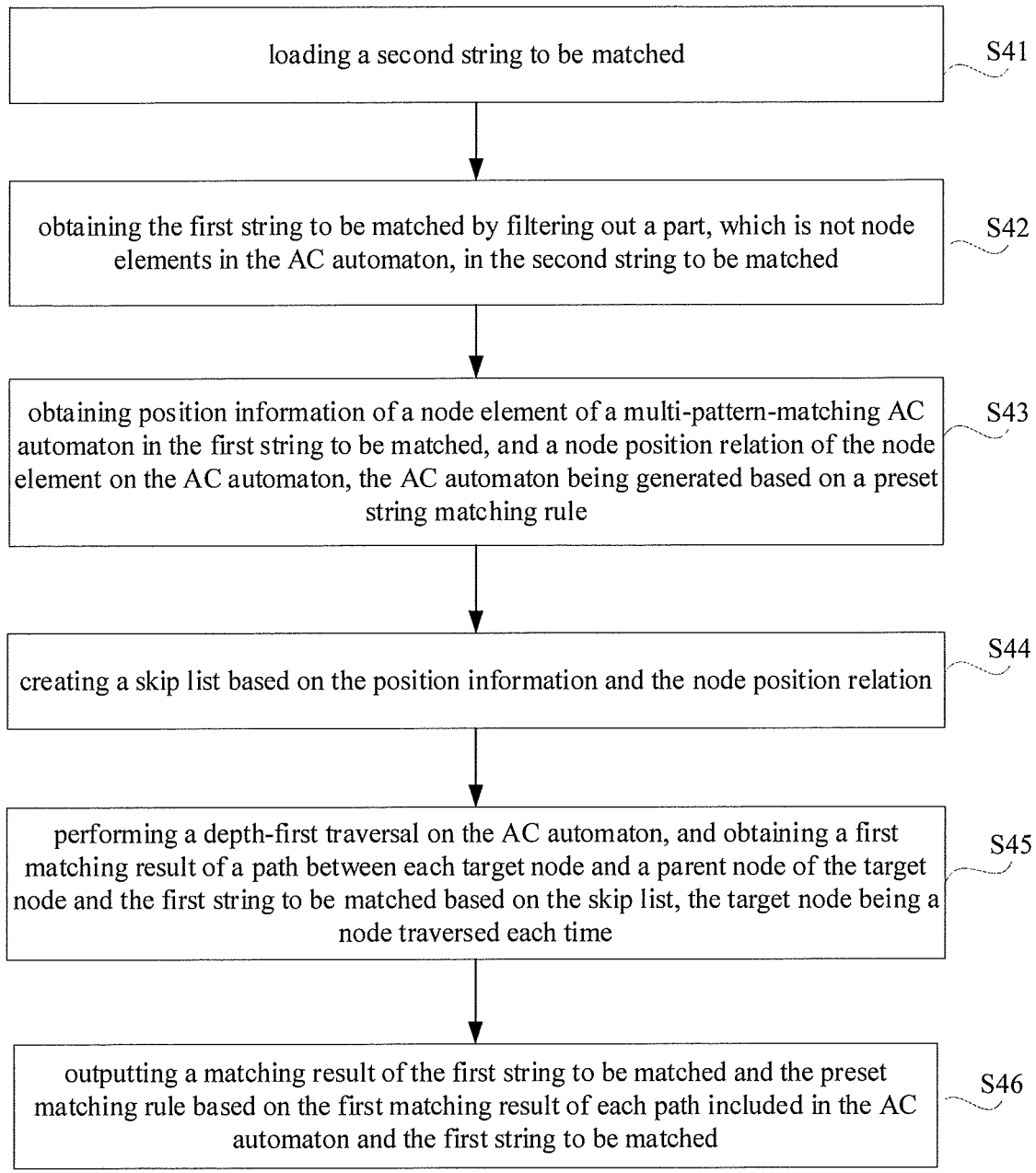
FIG. 4 is a flowchart of a string matching method according to an exemplary embodiment.

FIG. 4 is a flowchart of a string matching method according to an exemplary embodiment. As illustrated in FIG. 4, the string matching method includes the following.

At block S41, a second string to be matched is loaded.

At block S42, a first string to be matched is obtained by filtering out a part, which is not node elements in the AC automaton, in the second string to be matched.

At block S43, position information of a node element of an AC automaton in the first string to be matched, and a node position relation of the node element on the AC automaton, are obtained. The AC automaton is generated based on the preset string matching rule.

At block S44, a skip list is created based on the position information and the node position relation.

At block S45, a depth-first traversal is performed on the AC automaton, and a first matching result of a path between each target node and a parent node of the target node, and the first string to be matched is obtained based on the skip list. The target node is a node traversed each time. At block S46, a matching result of the first string to be matched and the preset matching rule is output based on the first matching result of each path included in the AC automaton and the first string to be matched.

That is, before the skip list is created, the second string to be matched may be loaded in advance, and elements in the second string to be matched, which do not exist in any matching rule are filtered to obtain the first string to be matched. Therefore, the first string to be matched is completely composed of the node elements of the AC automaton, so that the complexity of the string to be matched is simplified, the difficulty of creating the skip list is reduced, and the practicability of the method is improved.

Figure 5:
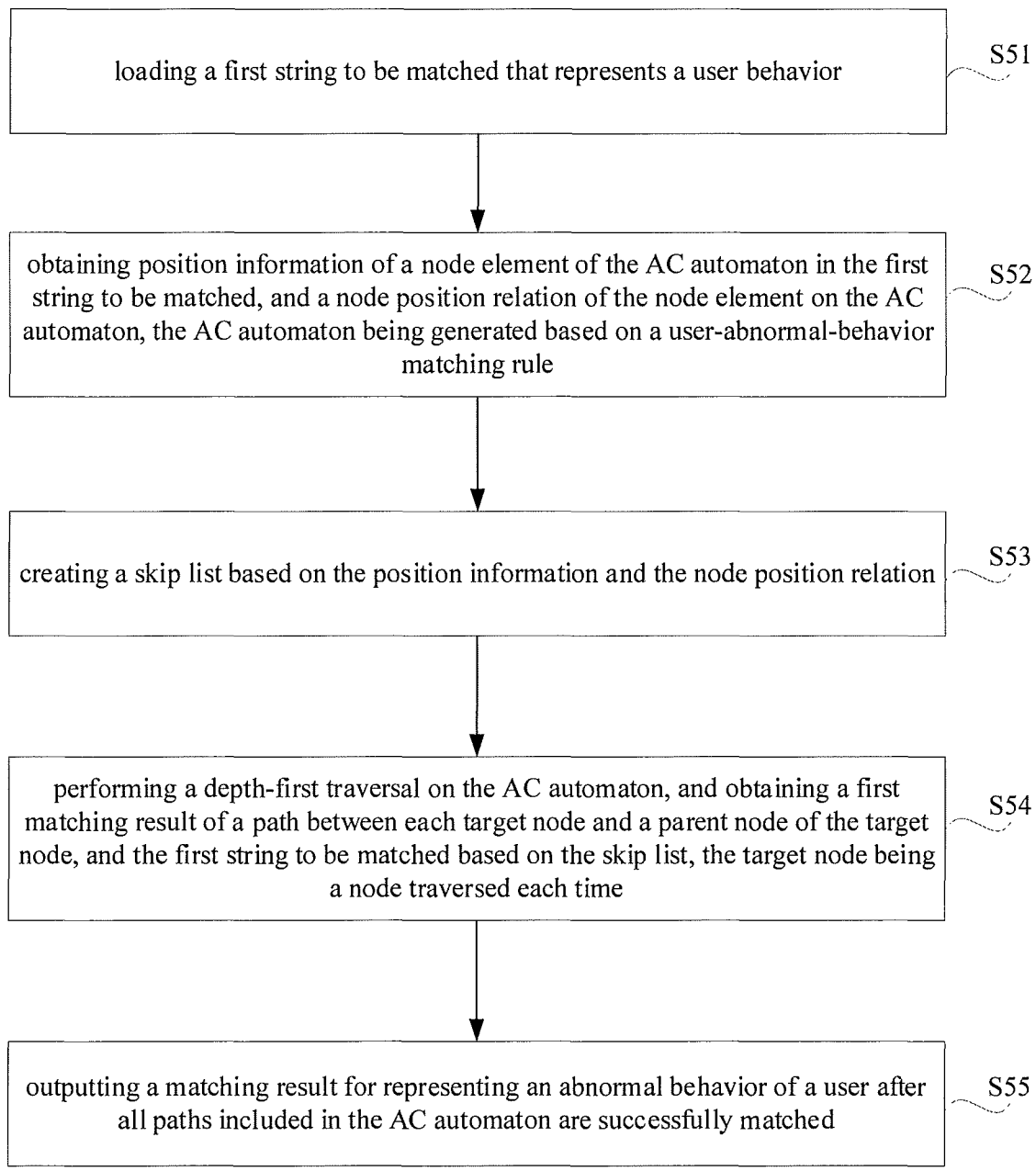
FIG. 5 is a flowchart of a string matching method according to an exemplary embodiment.

FIG. 5 is a flowchart of a string matching method according to an exemplary embodiment. As illustrated in FIG. 5, the string matching method includes the following.

At block S51, a first string to be matched that represents a user behavior is loaded.

At block S52, position information of a node element of the AC automaton in the first string to be matched, and a node position relation of the node element on the AC automaton, are obtained. The AC automaton is generated based on a user-abnormal-behavior matching rule.

At block S53, a skip list is created based on the position information and the node position relation.

At block S54, a depth-first traversal is performed on the AC automaton, and a first matching result of a path between each target node and a parent node of the target node, and the first string to be matched is obtained based on the skip list. The target node is a node traversed each time.

At block S55, a matching result for representing an abnormal behavior of a user is output after all paths included in the AC automaton are successfully matched. Therefore, by creating the AC automaton for the user-abnormal-behavior matching rule and adopting a method of combining the AC automaton with the skip list index, the string representing the behaviors of the user may be efficiently matched with the user-abnormal-behavior matching rule. In this manner, the problem that an abnormal state is difficult to be discovered in time due to low matching efficiency, which is generated when the abnormal behaviors do not occur continuously or other behaviors are mixed in the abnormal behaviors in the related art, is solved.

Figure 6:
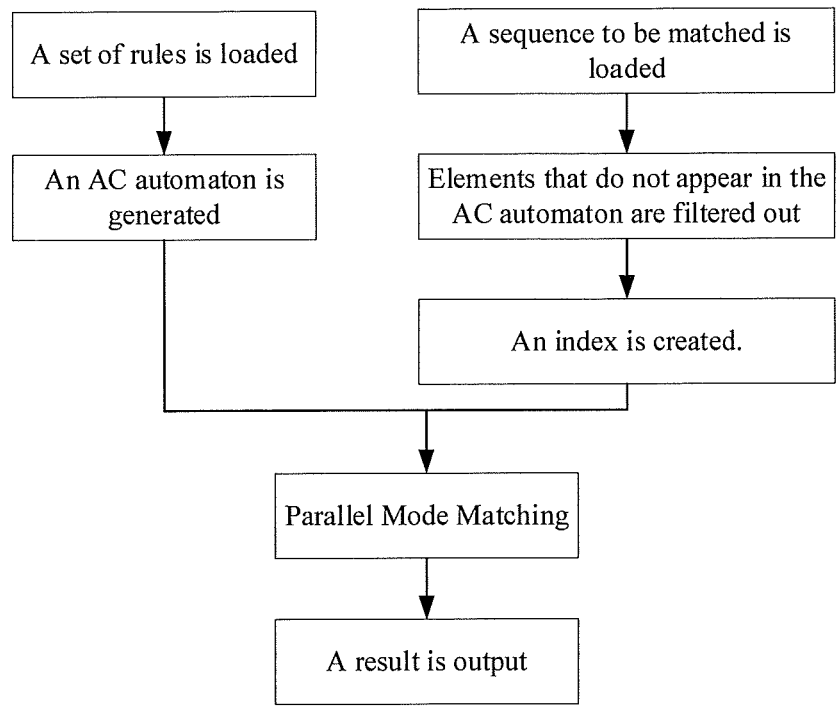
FIG. 6 is a flowchart of a string matching method according to an exemplary embodiment.

The above method embodiment is only an example. In the actual implementation, there may be various other embodiments, such as the embodiment illustrated in FIG. 6. Referring to FIG. 6, the string matching method can include the following.

A set of rules is loaded, and an AC automaton is generated based on matching rules in the set of rules.

A sequence to be matched is filtered to filter out elements that do not appear in the AC automaton, and an index of the corresponding node element is created based on position information of the node element in the AC automaton in the filtered sequence to be matched.

A depth-first traversal is performed on the AC automaton, and a matching result of a specific path is determined by searching the index.

Figure 7:
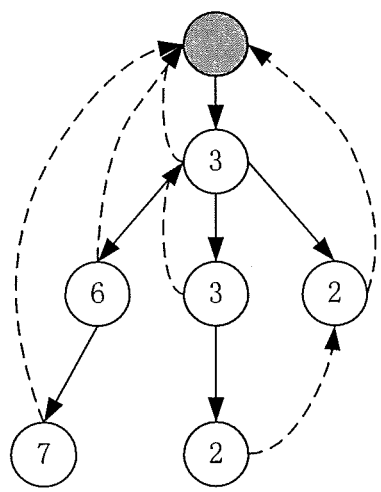
FIG. 7 is a schematic diagram of an AC automaton according to an exemplary embodiment.

A matching result of the sequence to be matched and the set of rules is output based on the matching results of all paths included in the AC automaton and the sequence to be matched. Illustratively, the matching rules 3*6*7, 3*3*2 and 3*2 are matched with the string to be matched 183935672332. The matching rules are loaded, the wildcards in the set of rules are filtered out to obtain new matching rules 367, 332 and 32, and the AC automaton, as illustrated in FIG. 7, is generated based on the new matching rules.

The string to be matched 183935672332 is loaded, and elements which do not appear in the AC automaton are filtered out to obtain a filtered string to be matched 33672332.

All position subscripts (which are arranged from small to large based on the sequence of the node elements appearing in the string to be matched) of the node elements of the AC automaton in the filtered string to be matched are obtained and indexes corresponding to the node elements are obtained. The indexes are:

3→0, 1, 5, 6;
6→2;
7→3;
2→4, 7.

The skip list is constructed based on the node position relations of the node elements belonging to the same matching rule on the AC automaton and the indexes corresponding to the node elements. For example, when the skip list of the matching rule 367 is created, the node elements corresponding to the matching rule 367 are embodied on the AC automaton as that the node element 3 is located at the parent node of the node element 6, and the node element 6 is located at the parent node of the node element 7, so that the skip list created for the matching rule 367 may include three layers, which are indexes of the node elements 3, 6, and 7 from top to bottom in sequence. The indexes may be implemented in the form of a linked list, and each element in the indexes may include a pointer to a next index element in the same layer and a pointer to a linked list index in a next layer.

The depth-first traversal is performed on the AC automaton, and the matching result of each path in the AC automaton is searched and determined based on the skip list.

The matching result of the string to be matched and the matching rule is output based on the matching results of all paths included in the AC automaton and the string to be matched.

Figure 8:
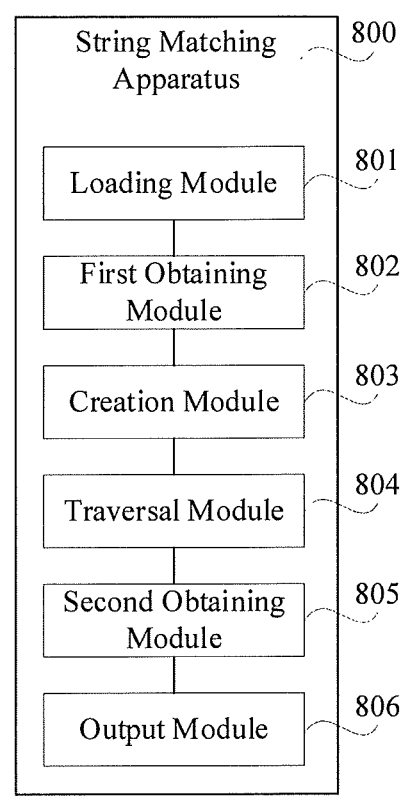
FIG. 8 is a block diagram of a string matching apparatus according to an exemplary embodiment.

FIG. 8 is a block diagram of a string matching apparatus according to an exemplary embodiment. The device can include a loading module 801, a first obtaining module 802, a creation module 803, a traversal module 804, a second obtaining module 805, and an output module 806. The loading module 801 is configured to load the first string to be matched.

The first obtaining module 802 is configured to obtain position information of a node element of a multi-pattern-matching Aho-Corasick (AC) automaton in the first string to be matched, and a node position relation of the node element on the AC automaton, the AC automaton being generated based on a preset string matching rule.

The creation module 803 is configured to create a skip list based on the position information and the node position relation.

The traversal module 804 is configured to perform a depth-first traversal on the AC automaton.

The second obtaining module 805 is configured to obtain a first matching result of a path between each target node and a parent node of the target node and the first string to be matched based on the skip list, the target node being a node traversed each time.

The output module 806 is configured to output a matching result of the first string to be matched and the preset matching rule based on the first matching result of each path included in the AC automaton and the first string to be matched.

By adopting the above device, the following technical effects may be achieved. For example, by generating the AC automaton based on the preset matching rule, a characteristic that the AC automaton may reduce the query time with a public prefix of the matching rule is used, thereby greatly reducing repeated comparison process. Meanwhile, the skip list is created based on the node position relation of the node element of the AC automaton in the AC automaton and the position information of the corresponding node element in the string to be matched. By utilizing a characteristic that the skip list index may realize quick search, the skip list index is applied to each path in the AC automaton to quickly obtain the matching result of the path. Finally, the AC automaton is traversed preferentially to complete selection of a sequencing of the matching path, by the traversal module, the first matching result of the corresponding path is obtained through the skip list by the second obtaining module, and the matching result of the first string to be matched and the preset matching rule is determined based on the first matching result of each path in the AC automaton and the first string to be matched. The output module outputs the matching result of the string to be matched and the matching rule. Consequently, advantages of the AC automaton and the skip list index are combined, efficient parallel fuzzy matching is realized, and string matching efficiency is improved.

Figure 9:
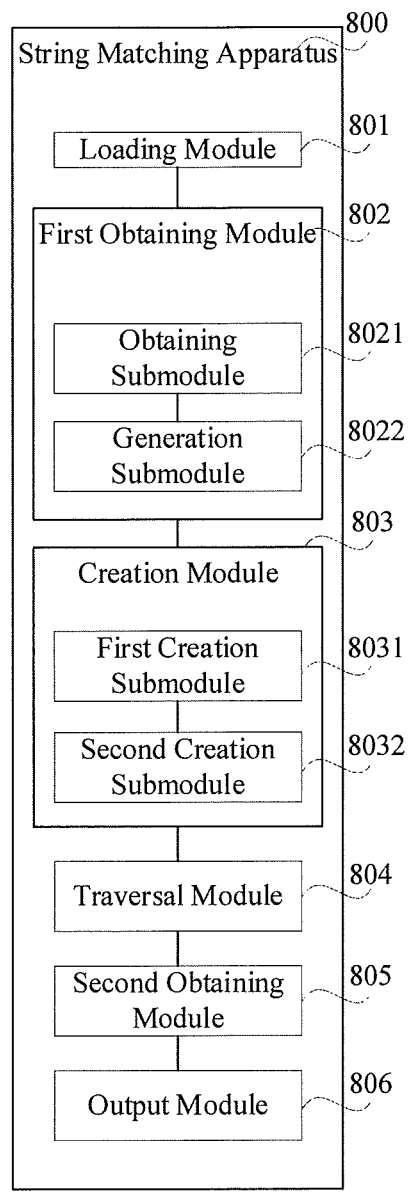
FIG. 9 is a block diagram of a string matching apparatus according to an exemplary embodiment.

FIG. 9 is a block diagram of a string matching apparatus 800 according to an exemplary embodiment. Referring to FIG. 9, the apparatus is based on FIG. 8, and the first obtaining module 802 includes an obtaining submodule 8021 and a generation submodule 8022.

The obtaining submodule 8021 is configured to obtain position information of each node element in the first string to be matched.

The generation submodule 8022 is configured to generate a set of position information corresponding to each node element based on the position information.

In detail, the position information is for indicating a sequencing of each node element in the AC automaton appearing in the first string to be matched.

The creation module 803 includes a first creation submodule 8031 and a second creation submodule 8032.

The first creation submodule 8031 is configured to create a linked list index corresponding to each node element based on the set of position information.

The second creation submodule 8032 is configured to create the skip list based on a hierarchical relationship among node elements in a set of node elements for representing the same matching rule in the AC automaton, and the linked list index.

In the skip list, a linked list index of a child node is a lower layer of a linked list index of the parent node.

Therefore, the skip list indexes are created for the matching rules through the creation module, so that in the actual matching process, the matching sequence of the paths may be determined through the traversal module, thereby affecting the effect of performing parallel matching on all the matching rules simultaneously. Meanwhile, matching results of specific paths may be determined based on the created skip list indexes, so that the time complexity of the method is reduced by using the skip list index and the matching rule is expanded to fuzzy fields. Consequently, the problem that a conventional AC automaton cannot efficiently perform the fuzzy matching is solved.

Figure 10:
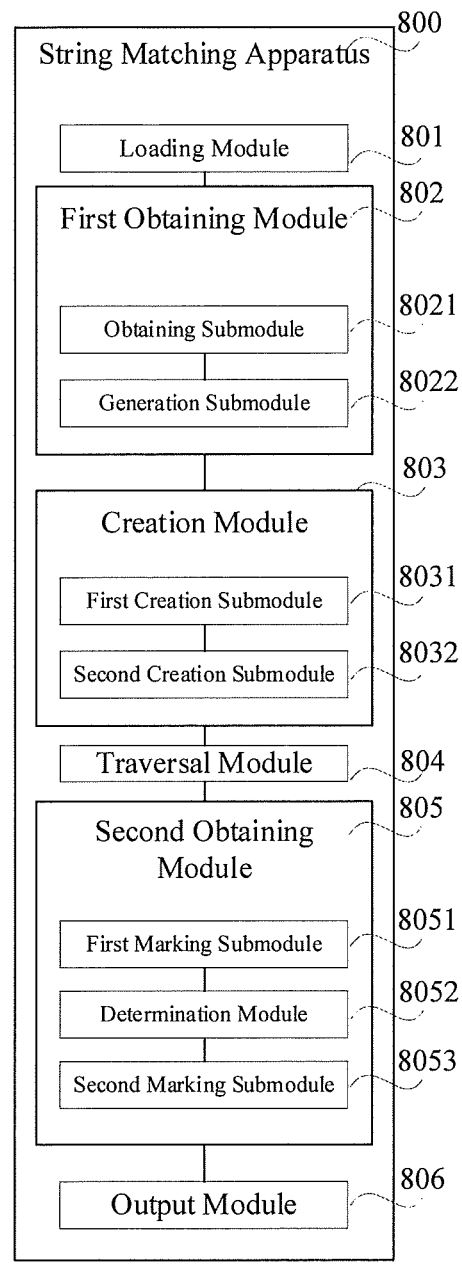
FIG. 10 is a block diagram of a string matching apparatus according to an exemplary embodiment.

FIG. 10 is a block diagram of a string matching apparatus 800 according to an exemplary embodiment. Referring to FIG. 10, the apparatus is based on FIG. 9, and the second obtaining module 805 can further include a first marking submodule 8051, a determination submodule 8052, and a second marking submodule 8053.

The first marking submodule 8051 is configured to, when nodes of a first layer in the AC automaton are traversed, sequentially add marks to the position information in the linked list indexes corresponding to node elements in the nodes of the first layer, in which the marked position information in the linked list indexes corresponding to the node elements in the nodes of the first layer is used as initial position information for searching the skip list.

The determination submodule 8052 is configured to, when nodes below the first layer in the AC automaton are traversed, take the nodes below the first layer as target nodes; search the skip list; when it is determined that target position information exists in a way of searching the skip list, determine that the path between the parent node of the target node and the target node is matched with the first string to be matched.

The target position information is, position information, in the linked list index corresponding to the node element of the target node, posterior to the latest marked position information in the linked list index corresponding to the node element of the parent node of the parent node.

The second marking submodule 8053 is configured to add a mark to the target position information, the marked target position information being initial position information for starting to search the skip list when the child node of the target node is traversed.

That is, the apparatus may not only expand the matching rule to the fuzzy fields, but also mark all matched results, namely, all targets which accord with the matching rule may be found in the string to be matched. Therefore, efficient parallel fuzzy matching is achieved and targets conforming to the fuzzy matching rule may be marked, such that subsequent statistics and analysis are facilitated, and the practicability of the apparatus is improved.

Figure 11:
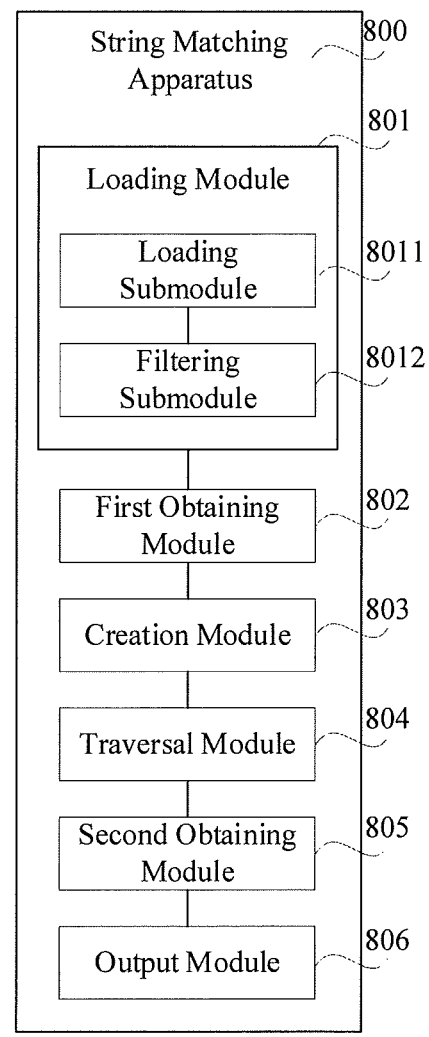
FIG. 11 is a block diagram of a string matching apparatus according to an exemplary embodiment.

FIG. 11 is a block diagram of a string matching apparatus 800 according to an exemplary embodiment. Referring to FIG. 11, the apparatus is based on FIG. 8, and the loading module 801 includes: a loading submodule 8011 and a filtering submodule 8012.

The loading submodule 8011 is configured to load the second string to be matched.

The filtering submodule 8012 is configured to obtain the first string to be matched by filtering out a part, which is not node elements in the AC automaton, in the second string to be matched.

Therefore, before the skip list is created, the second string to be matched may be loaded in advance, and a part in the second string to be matched that does not belong to the node elements of the AC automaton are filtered by the filtering submodule to obtain the first string to be matched. Therefore, the first string to be matched is completely composed of the node elements of the AC automaton, so that the complexity of the first string to be matched is simplified, the difficulty of creating the skip list is reduced, and the practicability of the apparatus is improved.

In a possible implementation, the loading module 801 is configured to load the first string to be matched for representing a user behavior.

The first obtaining module 802 is configured to obtain position information of a node element of the AC automaton in the first string to be matched, and a node position relation of the node element on the AC automaton, in which the AC automaton is generated based on a user-abnormal-behavior matching rule.

The creation module 803 is configured to create a skip list based on the position information and the node position relation.

The traversal module 804 is configured to perform a depth-first traversal on the AC automaton.

The second obtaining module 804 is configured to obtain a first matching result of a path between each target node and a parent node of the target node and the first string to be matched based on the skip list, the target node being a node traversed each time.

The output module 805 is configured to output a matching result representing an abnormal behavior of the user after all paths included in the AC automaton are successfully matched.

Therefore, by creating the AC automaton for the user-abnormal-behavior matching rule and adopting a method of combining the AC automaton with the skip list index, the string representing the behaviors of the user may be efficiently matched with the user-abnormal-behavior matching rule. In this manner, the problem that an abnormal state is difficult to be discovered in time due to low matching efficiency, which is generated when the abnormal behaviors do not occur continuously or other behaviors are mixed in the abnormal behaviors in the related art, is solved.

Regarding the apparatus in the above embodiment, specific operation manners of various modules in the apparatus have been described in detail in embodiments with respect to the method and thus will not be explained in detail herein.

The present disclosure further provides a computer readable storage medium having a computer program instruction stored thereon, in which when the program instruction is executed by a processor, the processor implements acts of the string matching method provided in the present disclosure.

The present disclosure further provides an electronic device. The electronic device includes a memory and a processor. The memory has a computer program stored thereon, and the processor is configured to execute the computer program in the memory for implementing acts of the string matching method provided in the present disclosure.

Figure 12:
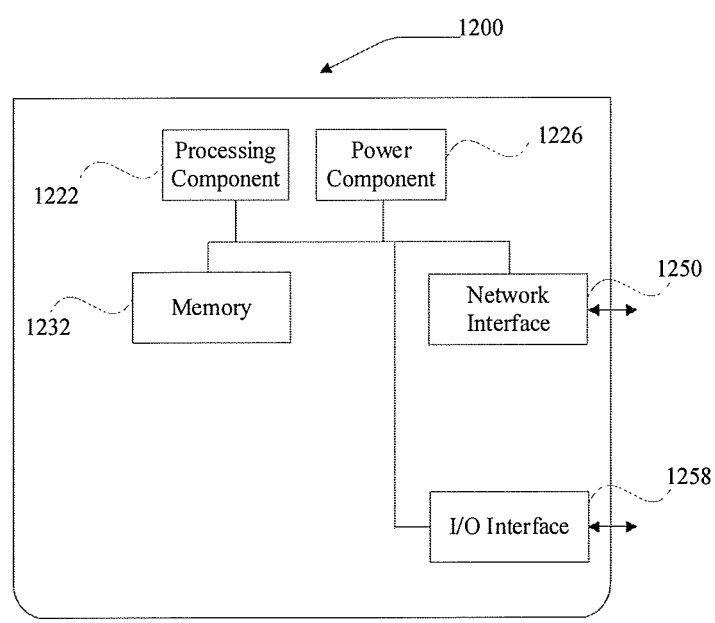
FIG. 12 is a block diagram of a string matching apparatus according to an exemplary embodiment.

FIG. 12 is a block diagram of a string matching device 1200 according to an exemplary embodiment. For example, the device 1200 may be provided as server. Referring to FIG. 12, the device 1200 includes a processing component 1222 that includes one or more processors, and memory resources represented by a memory 1232 for storing instructions (such as an application) that are executable by the processing component 1222. The application stored in the memory 1232 may include one or more modules, each of which corresponds to a set of instructions. Further, the processing component 1222 is configured to execute instructions to perform the string matching method described above.

The device 1200 may further include a power component 1226 configured to perform power management of the device 1200, a wired or wireless network interface 1250 configured to connect the device 1200 to a network, and an input/output (I/O) interface 1258. The device 1200 may operate an operating system such as Windows Server™, Mac OS X™, Unix™, Linux™, FreeBSD™, or the like, stored in the memory 1232.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A string matching method, comprising:
   loading a first string to be matched;
   obtaining position information of a node element of a multi-pattern-matching Aho-Corasick (AC) automaton in the first string to be matched and a node position relation of the node element on the AC automaton, the AC automaton being generated based on a preset string matching rule;

creating a skip list based on the position information and the node position relation;

performing a depth-first traversal on the AC automaton, and obtaining a first matching result of a path between a target node and a parent node of the target node and the first string to be matched based on the skip list, the target node being a node traversed each time; and outputting a matching result of the first string to be matched and the preset string matching rule based on the first matching result of a path included in the AC automaton and the first string to be matched, wherein obtaining the position information of the node element of the AC automaton in the first string to be matched further comprises:

obtaining position information of each node element in the first string to be matched; and generating a set of position information corresponding to each node element based on the position information, the position information for indicating a sequencing of each node element in the AC automaton appearing in the first string to be matched, wherein creating the skip list based on the position information and the node position relation further comprises:

creating a linked list index corresponding to each node element based on the set of position information; and creating the skip list based on a hierarchical relationship among node elements in a set of node elements for representing the same matching rule in the AC automaton, and the linked list index, in which in the skip list, a linked list index of a child node is a lower layer of a linked list index of the parent node.

2. The method of claim 1, wherein performing the depth-first traversal on the AC automaton, and obtaining the first matching result of the path between the target node and the parent node of the target node and the first string to be matched based on the skip list further comprises:

when nodes of a first layer in the AC automaton are traversed, sequentially adding marks to the position information in the linked list indexes corresponding to node elements in the nodes of the first layer, in which the marked position information in the linked list indexes corresponding to the node elements in the nodes of the first layer is used as initial position information for searching the skip list;

when nodes below the first layer in the AC automaton are traversed, taking the nodes below the first layer as target nodes;

when it is determined that target position information exists in a way of searching the skip list, determining that the path between the parent node of the target node and the target node is matched with the first string to be matched, the target position information being, position information, in the linked list index corresponding to the node element of the target node, posterior to the latest marked position information in the linked list index corresponding to the node element of the parent node of the parent node; and adding a mark to the target position information, the marked target position information being initial position information for starting to search the skip list when the child node of the target node is traversed.

3. The method of claim 1, wherein loading the first string to be matched further comprises:

loading a second string to be matched; and obtaining the first string to be matched by filtering out a part, which is not node elements in the AC automaton, in the second string to be matched.

4. The method of claim 2, wherein loading the first string to be matched further comprises:

loading a second string to be matched; and obtaining the first string to be matched by filtering out a part, which is not node elements in the AC automaton, in the second string to be matched.

5. The method of claim 1, wherein the first string to be matched is for representing a user behavior, and the matching rule is for representing a user-abnormal-behavior matching rule, and wherein outputting the matching result of the first string to be matched and the preset string matching rule based on the first matching result of the path included in the AC automaton and the first string to be matched further comprises outputting a matching result representing an abnormal behavior of a user after all paths included in the AC automaton are matched.

6. A non-transient computer readable storage medium having a computer program instruction stored thereon, wherein when the program instruction is executed by a processor, the processor implements a method comprising:

loading a first string to be matched;

obtaining position information of a node element of a multi-pattern-matching Aho-Corasick (AC) automaton in the first string to be matched and a node position relation of the node element on the AC automaton, the AC automaton being generated based on a preset string matching rule;

creating a skip list based on the position information and the node position relation;

performing a depth-first traversal on the AC automaton, and obtaining a first matching result of a path between the target node and a parent node of the target node and the first string to be matched based on the skip list, the target node being a node traversed each time; and outputting a matching result of the first string to be matched and the preset string matching rule based on the first matching result of a path included in the AC automaton and the first string to be matched, wherein obtaining the position information of the node element of the AC automaton in the first string to be matched further comprises:

obtaining position information of each node element in the first string to be matched; and generating a set of position information corresponding to each node element based on the position information, the position information for indicating a sequencing of each node element in the AC automaton appearing in the first string to be matched, wherein creating the skip list based on the position information and the node position relation further comprises:

creating a linked list index corresponding to each node element based on the set of position information; and creating the skip list based on a hierarchical relationship among node elements in a set of node elements for representing the same matching rule in the AC automaton, and the linked list index, in which in the skip list a linked list index of a child node is a lower layer of a linked list index of the parent node.

7. The non-transient computer readable storage medium of claim 6, wherein performing the depth-first traversal on the AC automaton, and obtaining the first matching result of the path between the target node and the parent node of the target node and the first string to be matched based on the skip list further comprises:
  when nodes of a first layer in the AC automaton are traversed, sequentially adding marks to the position information in the linked list indexes corresponding to node elements in the nodes of the first layer, in Which the marked position information in the linked first indexes corresponding to the node elements in the nodes of the first layer is used as initial position information for searching the skip list;
  when nodes below the first layer in the AC automaton are traversed, taking the nodes below the first layer as target nodes;
  when it is determined that target position information exists in a way of searching the skip list, determining that the path between the parent node of the target node and the target node is matched with the first string to be matched, the target position information being, position information, in the linked list index corresponding to the node element of the target node, posterior to the latest marked position information in the linked list index corresponding to the node element of the parent node of the parent node; and
  adding a mark to the target position information, the marked target position information being initial position information for starting to search the skip list when the child node of the target node is traversed.

8. The non-transient computer readable storage medium of claim 6, wherein loading the first string to be matched further comprises:
  loading a second string to be matched; and
  obtaining the first string to be matched by filtering out a part, which is not node elements in the AC automaton, in the second string to be matched.

9. The non transient computer readable storage medium of claim 7, wherein loading the first string to be matched further comprises:
  loading a second string to be matched; and
  obtaining the first string to be matched by filtering out a part, which is not node elements in the AC automaton, in the second string to be matched.

10. The non-transient computer readable storage medium of claim 6,
  wherein the first string to be matched is for representing a user behavior, and the matching rule is for representing a user-abnormal-behavior matching rule, and
  wherein outputting the matching result of the first string to be matched and the preset string matching rule based on the first matching result of the path included in the AC automaton and the first string to be matched further comprises outputting a matching result representing an abnormal behavior of a user after all paths included in the AC automaton are matched.

11. An electronic device, comprising:
  a memory having a computer program stored thereon; and
  a processor that is configured to execute the computer program in the memory for implementing a method comprising:
  loading a first string to be matched;
  obtaining position information of a node element of a multi-pattern-matching Aho-Corasick (AC) automaton in the first string to be matched and a node position relation of the node element on the AC automaton, the AC automaton being generated based on a preset string matching rule;
  creating a skip list based on the position information and the node position relation;
  performing a depth-first traversal on the AC automaton, and obtaining a first matching result of a path between a target node and a parent node of the target node and the first string to be matched based on the skip list, the target node being a node traversed each time; and
  outputting a matching result of the first string to be matched and the preset string matching rule based on the first matching result of a path included in the AC automaton and the first string to be matched,
  wherein obtaining the position information of the node element of the AC automaton in the first string to be matched further comprises:
    obtaining position information of each node element in the first string to be matched; and
    generating a set of position information corresponding to each node element based on the position information, the position information for indicating a sequencing of each node element in the AC automaton appearing in the first string to be matched,
  wherein creating the skip list based on the position information and the node position relation further comprises:
    creating a linked list index corresponding to each node element based on the set of position information; and
    creating the skip list based on a hierarchical relationship among node elements in a set of node elements for representing the same matching rule in the AC automaton, and the linked list index, in which in the skip list, a linked list index of a child node is a lower layer of a linked list index of the parent node.

12. The electronic device of claim 11, wherein performing the depth-first traversal on the AC automaton, and obtaining the first matching result of the path between the target node and the parent node of the target node and the first string to be matched based on the skip list further comprises:
  when nodes of a first layer in the AC automaton are traversed, sequentially adding marks to the position information in the linked list indexes corresponding to node elements in the nodes of the first layer, in which the marked position information in the linked list indexes corresponding to the node elements in the nodes of the first layer is used as initial position information for searching the skip list;
  when nodes below the first layer in the AC automaton are traversed, taking the nodes below the first layer as target nodes;
  when it is determined that target position information exists in a way of searching the skip list, determining that the path between the parent node of the target node and the target node is matched with the first string to be matched, the target position information being, position information, in the linked list index corresponding to the node element of the target node, posterior to the latest marked position information in the linked list index corresponding to the node element of the parent node of the parent node; and
  adding a mark to the target position information, the marked target position information being initial position information for starting to search the skip list when the child node of the target node is traversed.

13. The electronic device of claim 11, wherein loading the first string to be matched further comprises:
   loading a second string to be matched; and
   obtaining the first string to be matched by filtering out a part, which is not node elements in the AC automaton, in the second string to be matched.

14. The electronic device of claim 11,
   wherein the first string to be matched is for representing a user behavior, and the matching rule is for representing a user-abnormal-behavior matching rule, and
   wherein outputting the matching result of the first string to be matched and the preset string matching rule based on the first matching result of the path included in the AC automaton and the first string to be matched further comprises outputting a matching result representing an abnormal behavior of a user after all paths included in the AC automaton are matched.

* * * * *